United States Patent
Li et al.

(10) Patent No.: US 10,685,619 B2
(45) Date of Patent: Jun. 16, 2020

(54) DISPLAY APPARATUS AND RELATED DRIVING METHOD UTILIZING COMMON VOLTAGE MODULATION

(71) Applicants: Himax Display, Inc., Tainan (TW); HIMAX TECHNOLOGIES LIMITED, Tainan (TW)

(72) Inventors: Yuet Wing Li, Tainan (TW); Kuan-Hsu Fan-Chiang, Tainan (TW); Yih-Long Tseng, Tainan (TW); Ming-Cheng Chiu, Tainan (TW)

(73) Assignees: Himax Display, Inc., Tainan (TW); HIMAX TECHNOLOGIES LIMITED, Tainan (TW)

( * ) Notice: Subject to any disclaimer, the term of this patent is extended or adjusted under 35 U.S.C. 154(b) by 69 days.

(21) Appl. No.: 15/927,112

(22) Filed: Mar. 21, 2018

(65) Prior Publication Data

US 2018/0330691 A1 Nov. 15, 2018

Related U.S. Application Data

(60) Provisional application No. 62/503,940, filed on May 10, 2017.

(51) Int. Cl.
*G09G 3/36* (2006.01)
*G02F 1/133* (2006.01)
(Continued)

(52) U.S. Cl.
CPC .......... *G09G 3/3696* (2013.01); *G02F 1/1343* (2013.01); *G02F 1/13306* (2013.01);
(Continued)

(58) Field of Classification Search
CPC .......... G02F 1/13306; G02F 1/136286; G09G 3/3607; G09G 3/3614; G09G 3/3648;
(Continued)

(56) References Cited

U.S. PATENT DOCUMENTS

2006/0274011 A1* 12/2006 Igarashi ............... G09G 3/3648
345/94
2008/0055216 A1* 3/2008 Yen ....................... G09G 3/3648
345/87
(Continued)

FOREIGN PATENT DOCUMENTS

| CN | 101527124 A | 9/2009 |
|----|-------------|--------|
| CN | 105679264 A | 6/2016 |

(Continued)

*Primary Examiner* — Kenneth Bukowski
(74) *Attorney, Agent, or Firm* — Winston Hsu

(57) ABSTRACT

A driving method for a display apparatus is provided. The display apparatus includes data lines, scan lines and pixel units. Each pixel unit includes a pixel electrode and a common electrode. The driving method includes the following steps: when the display apparatus enters from a first frame period into a second frame period, switching a voltage level of a common voltage from a first common voltage level to a second common voltage level, and simultaneously changing a voltage level of the pixel electrode; during a data period of the second frame period, driving the scan lines according to a scanning sequence so as to write display data transmitted by data lines into the pixel units; and during a reset period of the second frame period, driving the scan lines according to the scanning sequence so as to write reset data transmitted by the data lines into the pixel units.

20 Claims, 12 Drawing Sheets

(51) Int. Cl.
 *G02F 1/1343* (2006.01)
 *G02F 1/1362* (2006.01)
(52) U.S. Cl.
 CPC ..... *G02F 1/136286* (2013.01); *G09G 3/3607* (2013.01); *G09G 3/3614* (2013.01); *G09G 3/3648* (2013.01); *G09G 3/3655* (2013.01); *G09G 2300/0814* (2013.01); *G09G 2310/0235* (2013.01); *G09G 2310/062* (2013.01)
(58) Field of Classification Search
 CPC ............... G09G 3/3655; G09G 3/3696; G09G 2300/0814; G09G 2310/0235; G09G 2310/062
 See application file for complete search history.

(56) References Cited

U.S. PATENT DOCUMENTS

2012/0113083 A1* 5/2012 Kim ................... G09G 3/344
 345/212
2016/0293125 A1* 10/2016 Huang ................ G09G 3/3614

FOREIGN PATENT DOCUMENTS

KR      10-1117990      3/2012
TW      201225052 A1   6/2012

* cited by examiner

DISPLAY APPARATUS AND RELATED DRIVING METHOD UTILIZING COMMON VOLTAGE MODULATION

CROSS REFERENCE TO RELATED APPLICATIONS

This application claims the benefit of U.S. provisional application No. 62/503,940, filed on May 10, 2017, the contents of which are incorporated herein by reference.

BACKGROUND OF THE INVENTION

1. Field of the Invention

The disclosed embodiments of the present invention relate to display driving, and more particularly, to a driving method for a display apparatus, which writes display data and rest data into pixel units during a same frame period and modulates a common voltage during transition between frame periods, and a related display apparatus.

2. Description of the Prior Art

As shown in FIG. 1, a pixel 102 of a conventional color-sequential display apparatus includes a plurality of transmission gates TY1, TY2, TD1 and TD2, and a plurality of storage capacitors CS1 and CS2, wherein each of the storage capacitors CS1 and CS2 is coupled to a reference voltage VR (e.g. a common voltage VC coupled to a liquid crystal capacitor CLC). During a frame period, the transmission gates TD1 and TY2 turn on, the transmission gates TY1 and TD2 turnoff, a data voltage VD1 stored in the storage capacitor CS1 is transmitted to the liquid crystal capacitor CLC, and a data voltage VD2 on a data line DL is temporarily stored in the storage capacitor CS2. During a next frame period, the transmission gates TY1 and TD2 turn on, the transmission gates TD1 and TY2 turn off, the data voltage VD2 temporarily stored in the storage capacitor CS2 is transmitted to the liquid crystal capacitor CLC, and the storage capacitor CS1 is used for temporarily storing data to be written. As the conventional color-sequential display apparatus needs to utilize multiple transistors and capacitors to transmit and temporarily store display data, a size of the pixel 102 cannot be reduced further. For example, the size of the pixel 102 cannot be reduced below 4 um×4 um.

Thus, there is a need for a novel display driving mechanism to provide a simple pixel design without the need of temporarily storing display data in advance.

SUMMARY OF THE INVENTION

In accordance with exemplary embodiments of the present invention, a driving method for a display apparatus, which writes display data and rest data into pixel units during a same frame period and modulates a common voltage during transition between frame periods, and a related display apparatus are proposed to solve the above-mentioned problems.

According to an embodiment of the present invention, an exemplary driving method for a display apparatus is disclosed. The display apparatus comprises a plurality of data lines, a plurality of scan lines, and a plurality of pixel units coupled to the data lines and the scan lines. Each pixel unit comprises a pixel electrode and a common electrode. A liquid crystal capacitor is formed between the pixel electrode and the common electrode. Respective common electrodes of the pixel units are coupled to a common voltage. The exemplary driving method comprises the following steps: when the display apparatus enters from a first frame period into a second frame period, switching a voltage level of the common voltage from a first common voltage level to a second common voltage level different from the first common voltage level, and simultaneously changing a voltage level of the pixel electrode of said each pixel unit, such that a magnitude of a voltage across between the liquid crystal capacitor of said each pixel unit is the same before and after the voltage level of the common voltage is switched; during a data period of the second frame period, driving the scan lines according to a scanning sequence so as to write display data transmitted by the data lines into the pixel units; and during a reset period of the second frame period, driving the scan lines according to the scanning sequence so as to write reset data transmitted by the data lines into the pixel units.

According to an embodiment of the present invention, an exemplary display apparatus is disclosed. The exemplary display apparatus comprises a plurality of data lines, a plurality of scan lines, a plurality of pixel units, a control circuit and a driver circuit. The pixel units are coupled to the data lines and the scan lines, wherein each pixel unit comprises a pixel electrode and a common electrode, a liquid crystal capacitor is formed between the pixel electrode and the common electrode, and respective common electrodes of the pixel units are coupled to a common voltage. The control circuit is arranged for providing the common voltage, wherein when the display apparatus enters from a first frame period into a second frame period, the control circuit switches a voltage level of the common voltage from a first common voltage level to a second common voltage level different from the first common voltage level. The driver circuit is coupled to the data lines and the scan lines, wherein when the control circuit switches the voltage level of the common voltage from the first common voltage level to the second common voltage level, the driver circuit drives the scan lines concurrently to reset respective voltage levels of pixel electrodes of the pixel units, such that a magnitude of a voltage across between the liquid crystal capacitor of said each pixel unit is the same before and after the voltage level of the common voltage is switched; during a data period of the second frame period, the driver circuit drives the scan lines according to a scanning sequence so as to write display data transmitted by the data lines into the pixel units; and during a reset period of the second frame period, the driver circuit drives the scan lines according to the scanning sequence so as to write reset data transmitted by the data lines into the pixel units.

These and other objectives of the present invention will no doubt become obvious to those of ordinary skill in the art after reading the following detailed description of the preferred embodiment that is illustrated in the various figures and drawings.

DETAILED DESCRIPTION

While a display apparatus is entering into a frame period (e.g. during transition between a previous frame period and a current frame period), the proposed driving mechanism for the display apparatus may switch a voltage level of a common voltage while maintaining a direct-current (DC) balance on liquid crystal material. In addition, during the frame period, the proposed driving mechanism may display a data frame and a reset frame (e.g. a dark frame, a bright frame or a predetermined gray level frame). With the aid of the proposed driving mechanism, the display apparatus may have a simple pixel design (e.g. a 2T1C pixel (two transistors and one capacitor per pixel) or a 1T1C pixel (one transistor and one capacitor per pixel)) without the need of temporarily storing display data in advance. For illustrative purposes, embodiments of a color sequential-display apparatus utilizing the proposed driving mechanism are first provided below. This is not intended to limit the scope of the present invention.

Figure 1:
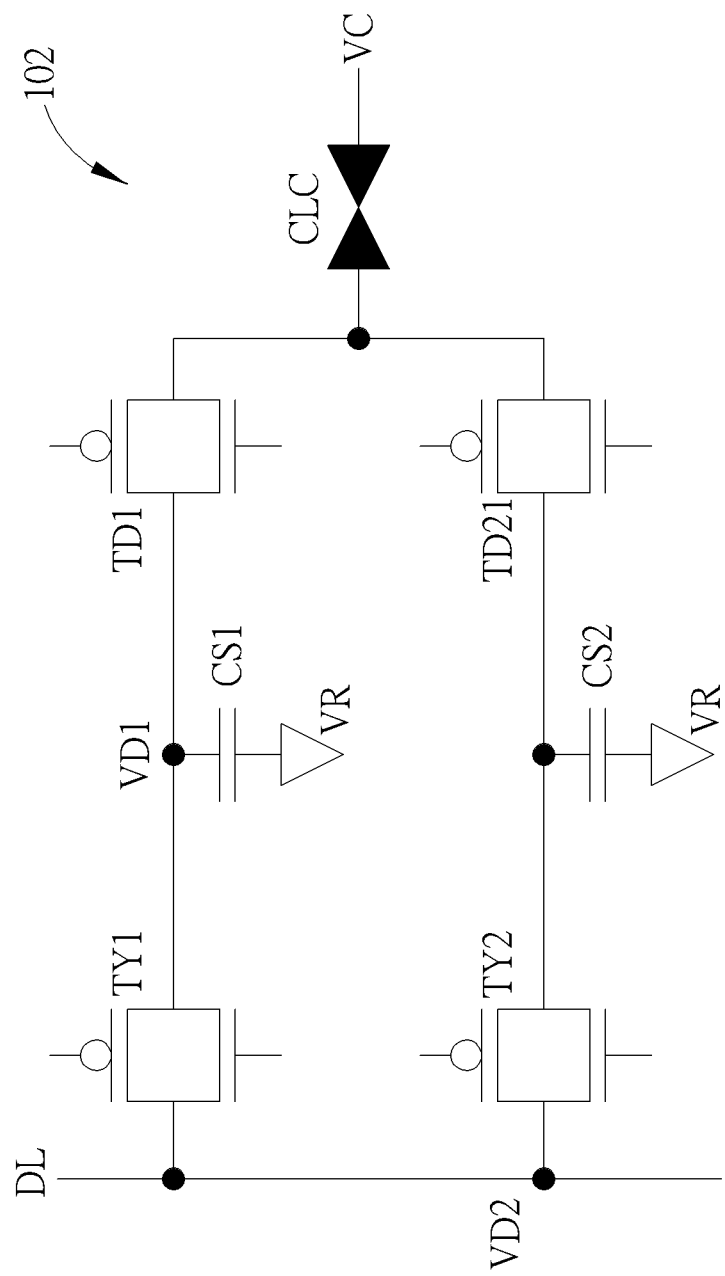
FIG. 1 is a diagram illustrating a pixel design in a conventional color-sequential display apparatus.
Figure 2:
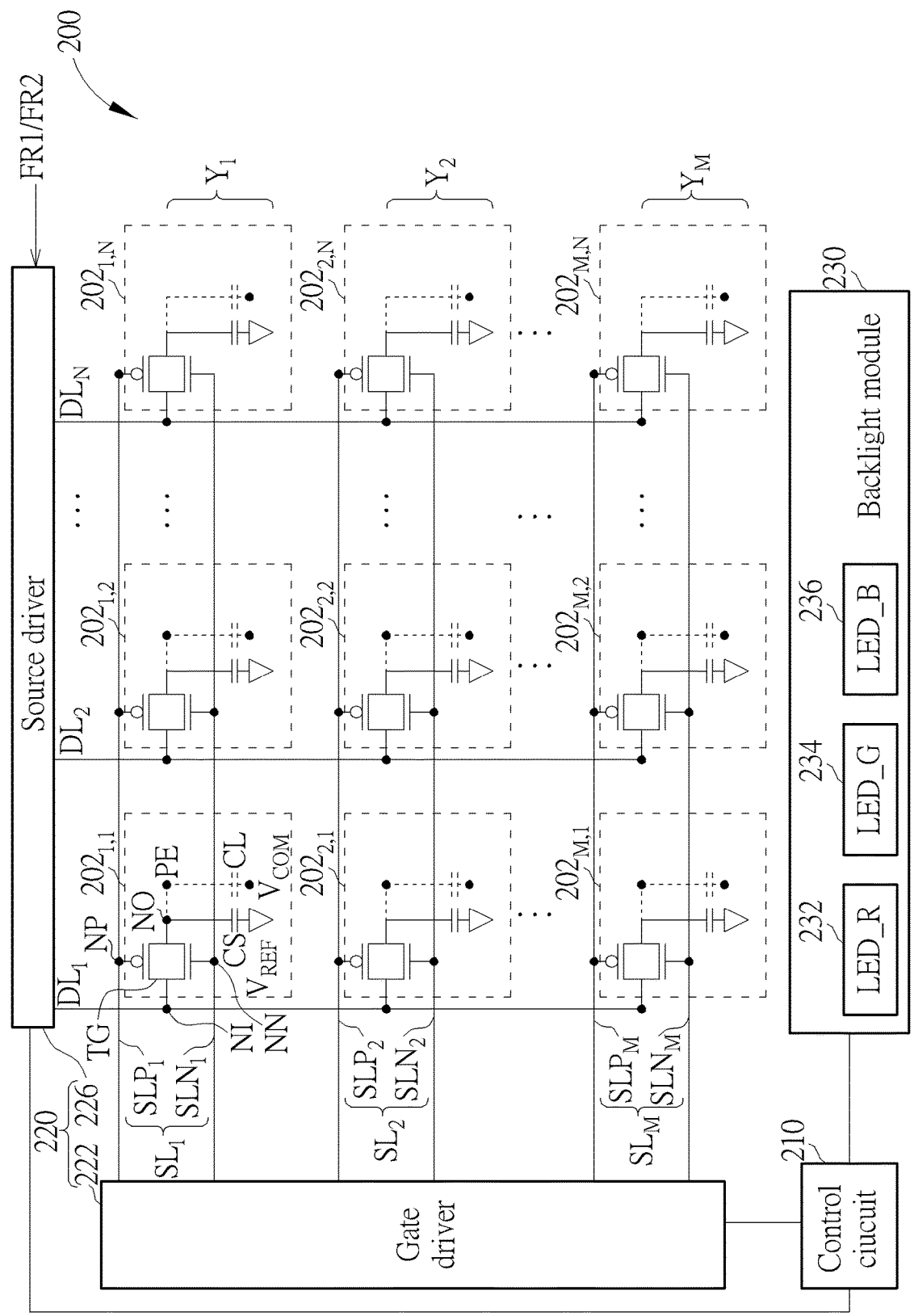
FIG. 2 is a diagram illustrating an exemplary display apparatus according to an embodiment of the present invention.

FIG. 2 is a diagram illustrating an exemplary display apparatus according to an embodiment of the present invention. The display apparatus 200 may be implemented by a sequential-color display apparatus such as a sequential-color liquid crystal on silicon (LCOS) display, and may include, but is not limited to, a plurality of data lines $DL_1$-$DL_N$ (N is a positive integer greater than one), M groups of scan lines $SL_1$-$SL_M$ (M is a positive integer greater than one), a plurality of pixel units $202_{1,1}$-$202_{M,N}$, a control circuit 210, a driver circuit 220 and a backlight module 230. In this embodiment, the pixel units $202_{1,1}$-$202_{M,N}$ are coupled to the data lines $DL_1$-$DL_N$ and the M groups of scan lines $SL_1$-$SL_M$, and may be arranged in M rows and N columns, wherein each pixel unit may be coupled to a data line and a group of scan lines, and each group of scan lines may include, but is not limited to, a plurality of scan lines $SLP_i$ and $SLN_i$ (i=1, 2, . . . , M). Each pixel unit may include, but is not limited to, a pixel electrode and a common electrode, and a liquid crystal capacitor is formed between the pixel electrode and the common electrode, wherein respective common electrodes of the pixel units $202_{1,1}$-$202_{M,N}$ may be coupled to a common voltage $V_{COM}$. For example, the pixel unit $202_{1,1}$ includes a pixel electrode PE and a common electrode CE, a liquid crystal capacitor CL is formed between the pixel electrode PE and the common electrode CE, and the common electrode CE is coupled to the common voltage $V_{COM}$.

In this embodiment, each pixel unit may further include a transmission gate and a storage capacitor, wherein a control terminal of the transmission gate is coupled to a scan line coupled to the pixel unit, an input terminal of the transmission gate is coupled to a data line coupled to the pixel unit, and an output terminal of the transmission gate is coupled to the storage capacitor and the pixel electrode of the pixel unit. For example, the pixel unit $202_{1,1}$ may include a transmission gate TG and a storage capacitor CS, wherein a control terminal NP of the transmission gate TG is coupled to the scan line $SLP_1$, a control terminal NI of the transmission gate TG is coupled to the scan line $SLN_1$, an input terminal NI of the transmission gate TG is coupled to the data line, and an output terminal NO of the transmission gate TG is coupled to the storage capacitor CS and the pixel electrode PE. The storage capacitor CS is further coupled to a reference voltage $V_{REF}$ such as the common voltage $V_{COM}$, a ground voltage or a predetermined voltage.

The control circuit 210 is coupled to the pixel units $202_{1,1}$-$202_{M,N}$, and may provide and/or modulate the common voltage $V_{COM}$. The control circuit 210 is further coupled to the drive circuit 220 and the backlight module 230, and may be arranged for controlling operation timing of the drive circuit 220 and the backlight module 230. For example, the driver circuit 220 may include a gate driver 222 and a source driver 226, wherein the gate driver 222 is coupled to the M groups of scan lines $SL_1$-$SL_M$ (or the scan lines $SLP_1$-$SLP_M$ and $SLN_1$-$SLN_M$), and the source driver 226 is coupled the data lines $DL_1$-$DL_N$. The control circuit 210 may control the gate driver 222 to scan/enable the M groups of scan lines $SL_1$-$SL_M$, and control the source driver 226 to provide corresponding data. The backlight module 230 may include at least one light emitting device, wherein the at least one light emitting device may be implemented by a red light emitting diode (LED) 232 (labeled LED_R), a green LED 243 (labeled LED_G) and a blue LED 236 (labeled LED_B) in this embodiment. The control circuit 210 may control activation timing of the red LED 232, the green LED 234 and the blue LED 236.

Figure 3:
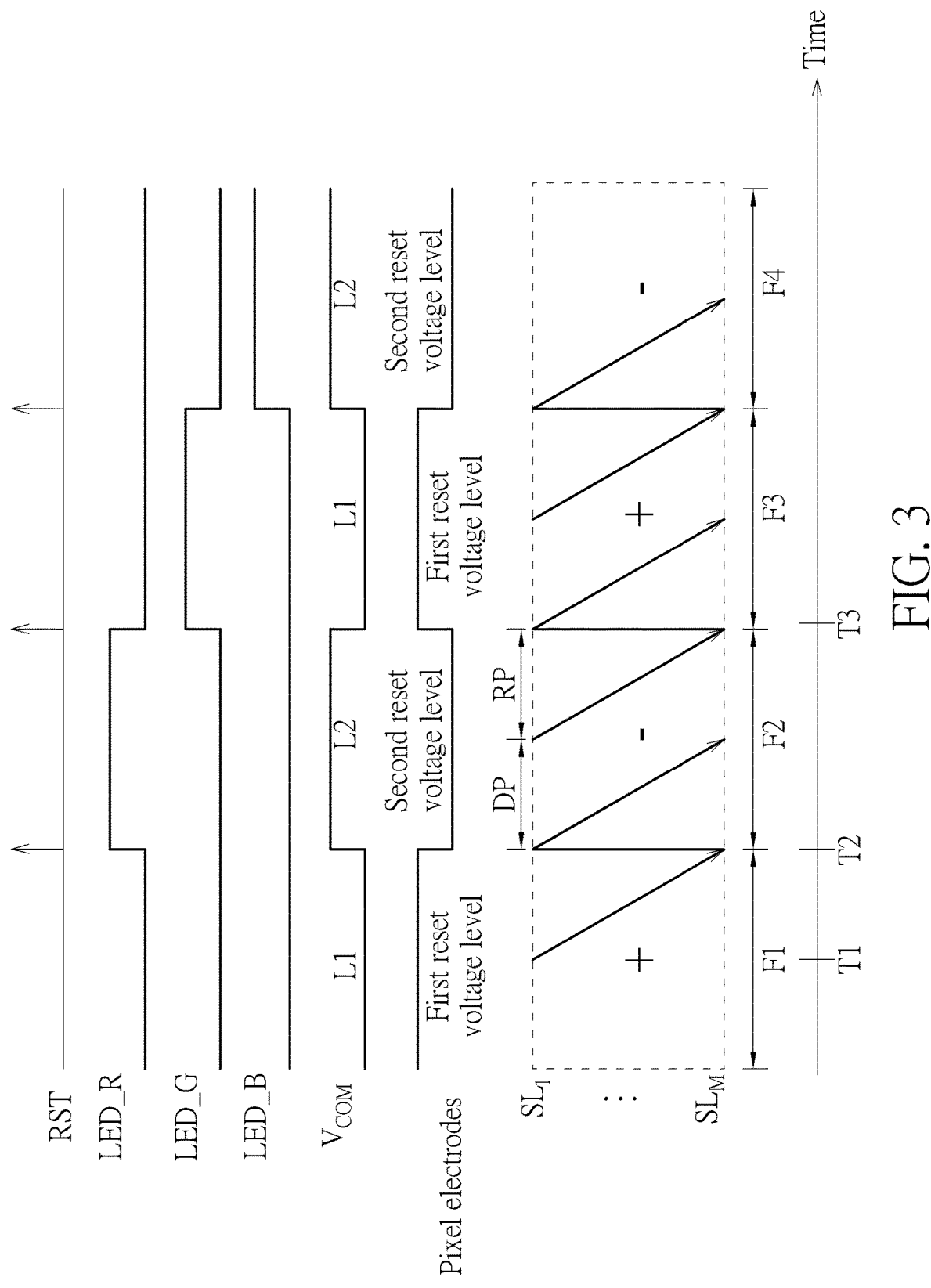
FIG. 3 is a diagram illustrating exemplary operation timing of the display apparatus shown in FIG. 2 according to an embodiment of the present invention.

By control scanning timing of the M groups of scan lines $SL_1$-$SL_M$, providing corresponding data through the data lines $DL_1$-$DL_N$, and modulating the common voltage $V_{COM}$ in a timely manner, the display apparatus 200 may provide fast frame switching and good image quality without the need of temporarily storing display data. Please refer to FIG. 3 in conjunction with FIG. 2. FIG. 3 is a diagram illustrating exemplary operation timing of the display apparatus 200 shown in FIG. 2 according to an embodiment of the present invention. In this embodiment, during a frame period F1 (e.g. corresponding to a positive frame), the common voltage $V_{COM}$ may have a common voltage level L1 (e.g. 0V). The gate driver 222 drives the M groups of scan lines $SL_1$-$SL_M$ according to a scanning sequence at a point in time T1 so as to reset the pixel units $202_{1,1}$-$202_{M,N}$. For example, the gate driver 222 may drive one group of scan lines at a time (i.e. enabling one row of pixel units at a time) to write dark/black data (or dark/black frame data) into the pixel units $202_{1,1}$-$202_{M,N}$, wherein when the gate driver 222 scans a group of scan lines, the source driver 226 may write a dark/black voltage into each pixel unit of a corresponding row of pixel units through the data lines $DL_1$-$DL_N$, such that each pixel electrode within the corresponding row of pixel units may have a dark/black voltage level (e.g. 6V).

When the display apparatus 200 enters from the frame period F1 into a frame period F2 (e.g. corresponding to a negative frame) at a point in time T2, the control circuit 210 may switch the voltage level of the common voltage $V_{COM}$ from the common voltage level L1 to a common voltage level L2 (e.g. 6V), and simultaneously control the gate driver 222 to drive the M groups of scan lines $SL_1$-$SL_M$ concurrently to change an entire frame of pixel data, such that a magnitude of a voltage across between the liquid crystal capacitor of each pixel unit is the same before and after the voltage level of the common voltage $V_{COM}$ is switched (e.g. 6V). For example, the gate driver 222 may drive the M groups of scan lines $SL_1$-$SL_M$ concurrently in response to a global reset signal RST provided by the control circuit 210, thereby resetting respective voltage levels of pixel electrodes of the pixel units $202_{1,1}$-$202_{M,N}$, wherein the source driver 226 may write another dark/black voltage into the pixel units $202_{1,1}$-$202_{M,N}$ through the data lines $DL_1$-$DL_N$, and each pixel electrode may have another dark/black voltage level (e.g. 0V).

After switching terminal voltages of each liquid crystal capacitor to maintain the DC balance, during a data period of the frame period F2, the gate driver 222 may drive the M groups of scan lines according to the scanning sequence so as to write display data transmitted by the data lines $DL_1$-$DL_N$ into the pixel units $202_{1,1}$-$202_{M,N}$. During a reset period RP of the frame period F2, the gate driver 222 may drive the M groups of scan lines according to the scanning sequence so as to write reset data transmitted by the data lines $DL_1$-$DL_N$ into the pixel units $202_{1,1}$-$202_{M,N}$, thereby resetting each pixel unit again. For example, the reset data may be dark/black data (or dark/black frame data) such that a voltage level of each pixel electrode may be set to said another dark/black voltage level (e.g. 0V).

Next, when the display apparatus 200 enters from the frame period F2 into a frame period F3 (e.g. corresponding to a positive frame) at a point in time T3, the control circuit 210 may switch the voltage level of the common voltage $V_{COM}$ from the common voltage level L2 to the common voltage level L1 (e.g. 0V), and simultaneously control the gate driver 222 to drive the M groups of scan lines $SL_1$-$SL_M$ concurrently to change an entire frame of pixel data to thereby maintain the DC balance on liquid crystal material. For example, the gate driver 222 may drive the M groups of scan lines $SL_1$-$SL_M$ concurrently in response to the global reset signal RST, such that a voltage level of the pixel electrode of each pixel unit may be set to the dark/black voltage level (e.g. 6V). As the driving operation of the display apparatus 200 during the frame period F3/F4 may be identical/similar to that during the frame period F2, repeated description is omitted here for brevity.

In conjunction with the aforementioned driving operation, the display apparatus 200 may activate the red LED 232, the green LED 234 and the blue LED 236 alternately during different frame periods to achieve high frame refresh rates in a simple pixel structure. For example, during the frame period F2, the control circuit 210 may enable the red LED 232 to emit red light such that the display apparatus 200 may display a red image; during the frame period F3, the control circuit 210 may enable the green LED 234 to emit green light such that the display apparatus 200 may display a green image; during the frame period F4, the control circuit 210 may enable the blue LED 236 to emit blue light such that the display apparatus 200 may display a blue image, and so on. In other words, the frame period F2/F3/F4 may be regarded as a subframe period involved in color-sequential technology (a single-color frame period).

Figure 4:
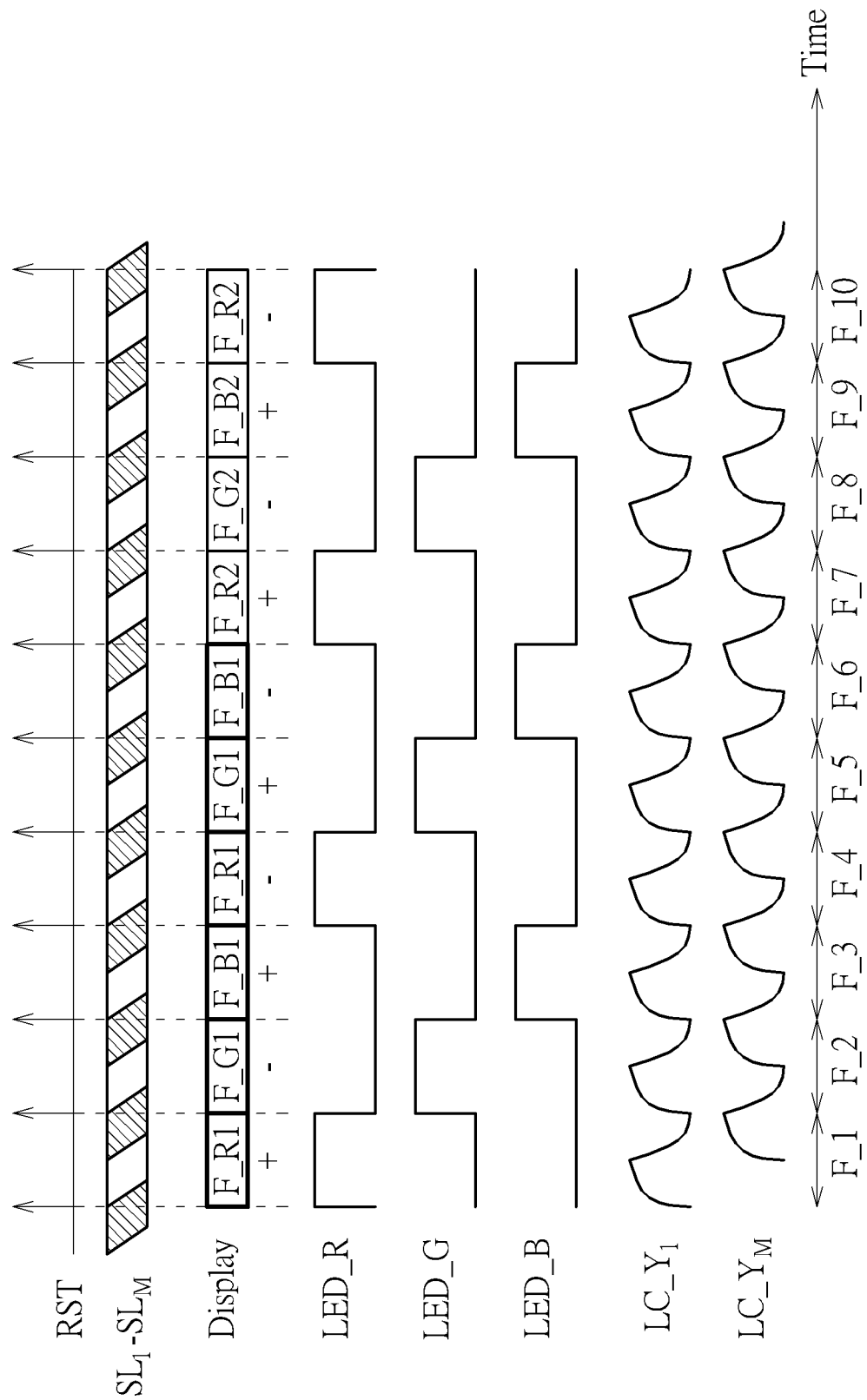
FIG. 4 is a timing diagram associated with the display apparatus shown in FIG. 2 used for displaying an input frame including a plurality of subframes.

Please refer to FIG. 4 in conjunction with FIG. 2. FIG. 4 is a timing diagram associated with the display apparatus 200 shown in FIG. 2 used for displaying an input frame (a full-color frame) including a plurality of subframes (single-color frames). In this embodiment, in addition to the operation timing shown in FIG. 3, FIG. 4 further shows a relationship between each subframe and the input frame. For example, the source driver 226 may receive image data of a red subframe F_R1, image data of a green subframe F_G1, and image data of a blue subframe F_B1 generated by decompressing image data of a full-color frame F_B1. During the frame periods F_1-F_6, the control circuit 210 may activate the red LED 232, the green LED 234 and the blue LED 236 alternately, such that the display apparatus 200 may display the red subframe F_R1 with positive polarity during the frame period F_1, display the green subframe F_G1 with negative polarity during the frame period F_2, display the blue subframe F_B1 with positive polarity during the frame period F_3, display the red subframe F_R1 with negative polarity during the frame period F_4, display the green subframe F_G1 with positive polarity during the frame period F_5, and display the blue subframe F_B1 with negative polarity during the frame period F_6. It should be noted that, compared with the conventional color-sequential technology which consecutively displays two subframes of the same color, the display apparatus 200 may display different single-color subframes alternately. The color breakup phenomenon may be avoided/improved.

Similarly, regarding a full-color frame FR2 following the full-color frame FR1, the display apparatus 200 may display the red subframe F_R2 with positive polarity during the frame period F_7, display the green subframe F_G2 with negative polarity during the frame period F_8, display the blue subframe F_B2 with positive polarity during the frame period F_9, display the red subframe F_R2 with negative polarity during the frame period F_10, and so on, wherein image data of the red subframe F_R2, image data of the green subframe F_G2, and image data of the blue subframe F_B2 generated by decompressing image data of the full-color frame FR2.

Figure 5:
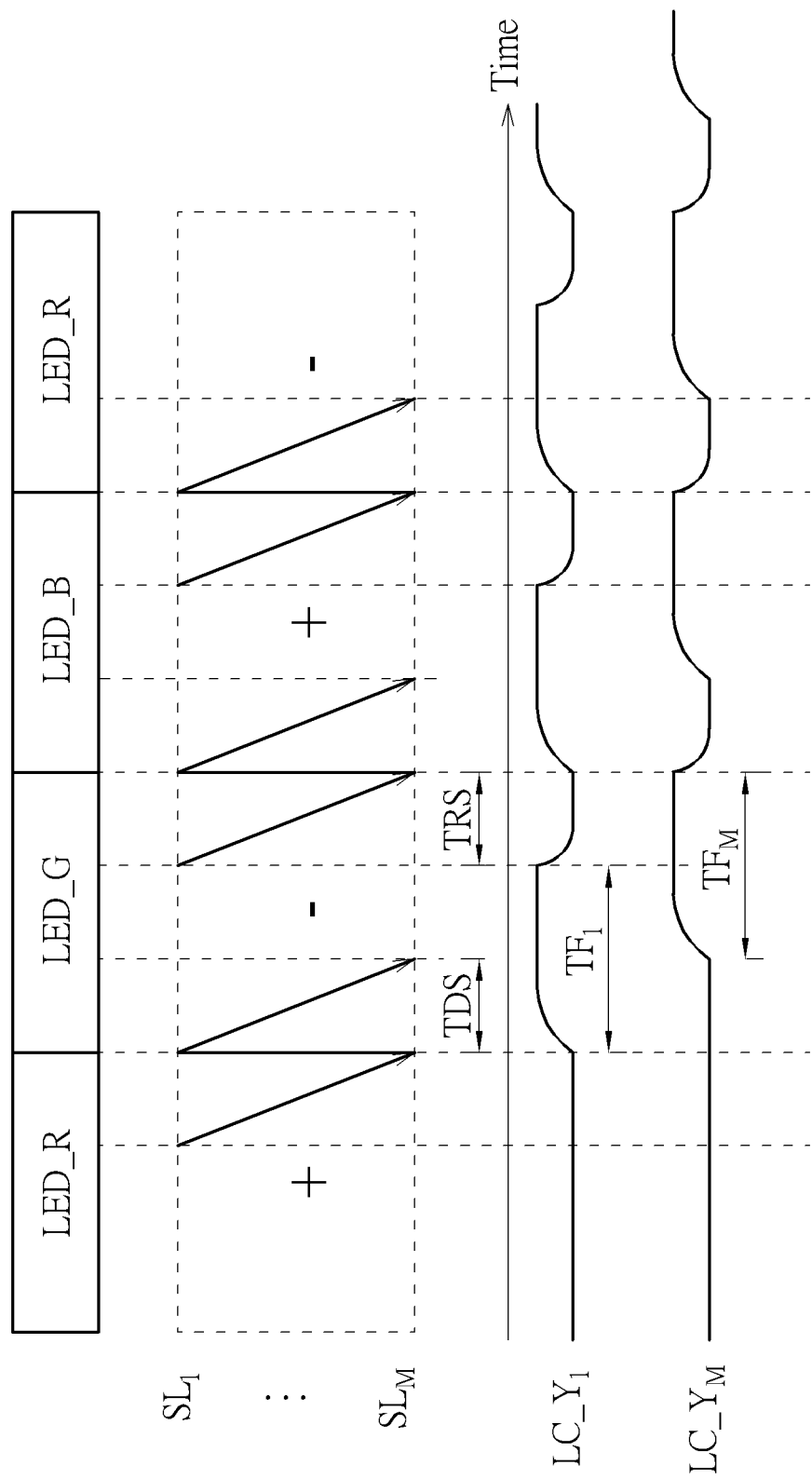
FIG. 5 is a diagram illustrating exemplary liquid crystal responses of the rows of pixel units shown in FIG. 2 on the driving timing according to an embodiment of the present invention.

Additionally, as each frame period may include a data period and a reset period, liquid crystal material may be switched between a bright state and a dark state. For example, during the frame period F_1, liquid crystal material of a row of pixel units $Y_1$ may be switched from a bright state to a dark state gradually (the liquid crystal response $LC\_Y_1$ shown in FIG. 4), and liquid crystal material of a row of pixel units $Y_M$ may be switched from a dark state to a bright state gradually (the liquid crystal response $LC\_Y_M$ shown in FIG. 4). Hence, brightness of each row of pixel units in a frame may be determined according to a relationship between time and an optical state of liquid crystal material. Please refer to FIG. 5 in conjunction with FIG. 2. FIG. 5 is a diagram illustrating exemplary liquid crystal responses of the row of pixel units $Y_1$ and the row of pixel units $Y_M$ shown in FIG. 2 on the driving timing according to an embodiment of the present invention. In this embodiment, a scan time period TDS required for the gate driver 222 to drive the M groups of scan lines $SL_1$-$SL_M$ to write the display data into the pixel units $202_{1,1}$-$202_{M,N}$ may be equal to a scan time period TRS required for the gate driver 222 to drive the M groups of scan lines $SL_1$-$SL_M$ to write the reset data into the pixel units $202_{1,1}$-$202_{M,N}$. Hence, respective periods of time during which liquid crystal material of the rows of pixel units $Y_1$-$Y_M$ receive data voltages (a bright portion of a liquid crystal response) may be the same, and respective periods of time during which liquid crystal material of the rows of pixel units $Y_1$-$Y_M$ receive reset voltages (a dark portion of a liquid crystal response) may be the same. The entire frame may have uniform brightness. For example, a period of time $TF_1$ during which the row of pixel units $Y_1$ receives data voltages may be identical to a period of time $TF_M$ during which the row of pixel units $Y_M$ receives data voltages.

In some embodiments, in order to ensure that respective scan line driving operations can be completed within a data period and a reset period during a frame period, at least one of the scan time period TDS required for the gate driver 222 to drive the M groups of scan lines $SL_1$-$SL_M$ to write the display data into the pixel units $202_{1,1}$-$202_{M,N}$ and the scan time period TRS required for the gate driver 222 to drive the M groups of scan lines $SL_1$-$SL_M$ to write the reset data into the pixel units $202_{1,1}$-$202_{M,N}$ is shorter than or equal to half a corresponding frame period.

It should be noted that the shorter the scan time period TDS/TRS, the longer the respective periods of time during which the rows of pixel units $Y_1$-$Y_M$ receive data voltages, meaning that the bright portion of the liquid crystal response may be longer. In other words, each pixel unit may have better optical efficiency. Firstly, please refer to FIG. 6, which is diagram illustrating exemplary scanning timing of the M groups of scan lines $SL_1$-$SL_M$ and the data lines $DL_1$-$DL_M$ shown in FIG. 2 according to an embodiment of the present invention. In this embodiment, the gate driver 222 shown in FIG. 2 enables one row of pixel units at a time, so as to write the display/reset voltages provided by the source driver 226 into the row of pixel units, wherein data $DA\_Y_1$-$DA\_Y_M$ (or the data/reset voltages) may be written into the rows of pixel units $Y_1$-$Y_M$ respectively. By way of example but not limitation, the data $DA\_Y_1$ may include N data/reset voltages written into the N pixel units $202_{1,1}$-$202_{1,N}$ (the row of pixel units $Y_1$).

Figure 7:
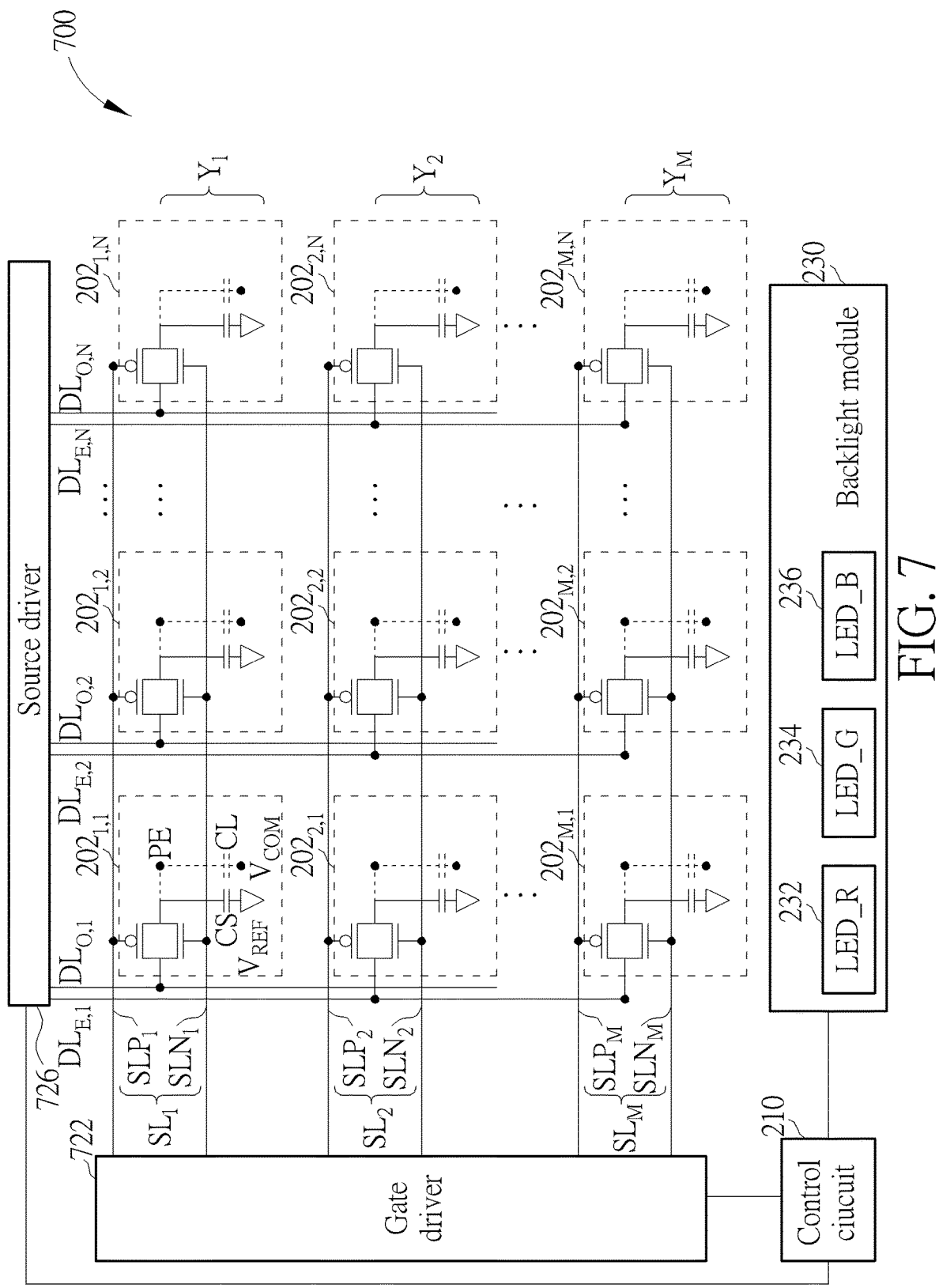
FIG. 7 is a diagram illustrating an exemplary display apparatus according to another embodiment of the present invention.
Figure 8:
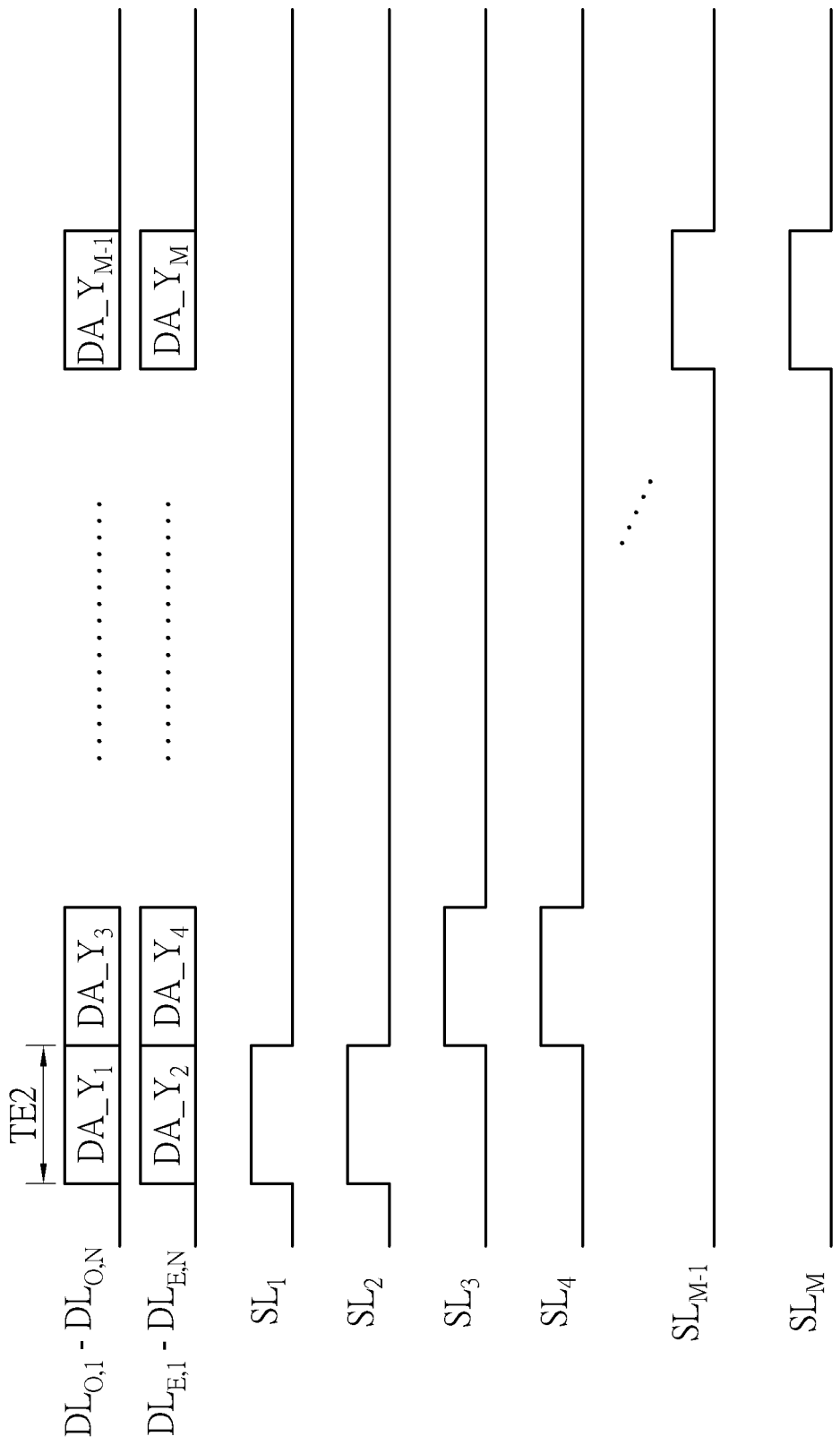
FIG. 8 is a diagram illustrating exemplary scanning timing of the groups of scan lines and the data lines shown in FIG. 7 according to an embodiment of the present invention.

In addition to enabling one row of pixel units at a time, the proposed driving method may enable multiple rows of pixel units to increase a scanning speed. Please refer to FIG. 7 and FIG. 8 together. FIG. 7 is a diagram illustrating an exemplary display apparatus according to another embodiment of the present invention. FIG. 8 is a diagram illustrating exemplary scanning timing of the M groups of scan lines $SL_1$-$SL_M$ and the data lines $DL_1$-$DL_M$ shown in FIG. 7 according to an embodiment of the present invention. In this embodiment, the gate driver 722 shown in FIG. 7 enables two rows of pixel units at a time, so as to write display/reset voltages provided by the source driver 726 into two rows of pixel units. The structure of the display apparatus 700 shown in FIG. 7 is based on the structure of the display apparatus 200 shown in FIG. 2, wherein the main difference is that the source driver 726 is coupled to odd rows of pixel units $Y_1$, $Y_3$, ..., $Y_{M-1}$ through a plurality of data lines $DL_{O,1}$-$DL_{O,N}$ and is coupled to even rows of pixel units $Y_2$, $Y_4$, ..., $Y_M$ through a plurality of data lines $DL_{E,1}$-$DL_{E,N}$. In the embodiment shown in FIG. 8, the data $DA\_Y_1$, $DA\_Y_3$, ..., $DA\_Y_{M-1}$ (data voltages or reset voltages) may be written into the odd rows of pixel units $Y_1$, $Y_3$, ..., $Y_{M-1}$, and the data $DA\_Y_2$, $DA\_Y_4$, ..., $DA\_Y_M$ (data voltages or reset voltages) may be written into the odd rows of pixel units $Y_2$, $Y_4$, ..., $Y_M$. M is assumed to be an even number for illustrative purposes. However, this is not meant to be a limitation of the present invention.

Figure 6:
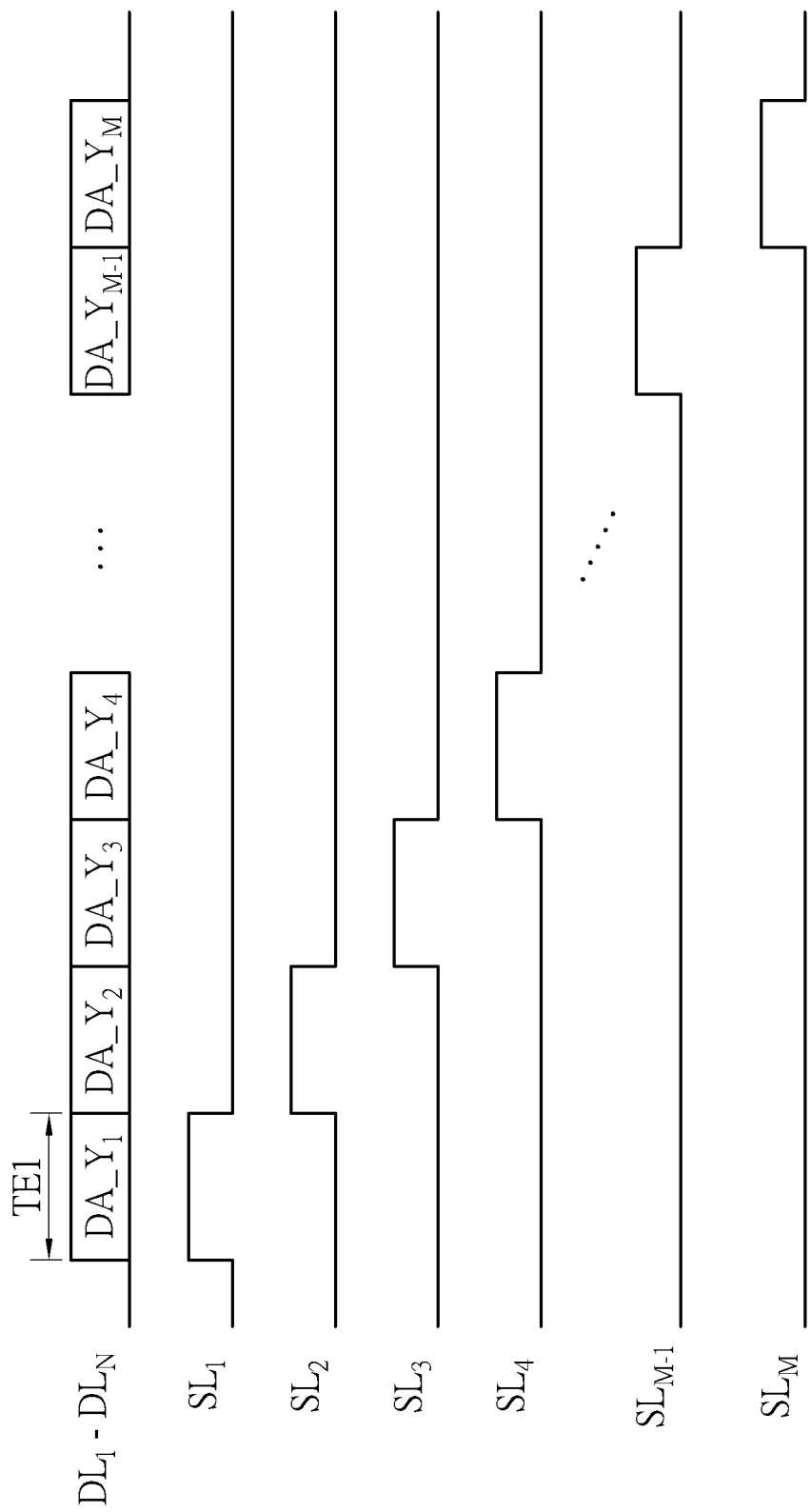
FIG. 6 is diagram illustrating exemplary scanning timing of the groups of scan lines and the data lines shown in FIG. 2 according to an embodiment of the present invention.

In a case where a period of time TE1 during which a row of pixel units shown in FIG. 6 is enabled is equal to a period of time TE2 during which a row of pixel units shown in FIG. 8 is enabled, a scan time period required to drive the M groups of scan lines $SL_1$-$SL_M$ shown in FIG. 7 may be half a scan time period required to drive the M groups of scan lines $SL_1$-$SL_M$ shown in FIG. 2. Hence, a period of time during which liquid crystal material stays in a bright portion may be increased, which improves optical efficiency.

Figure 9:
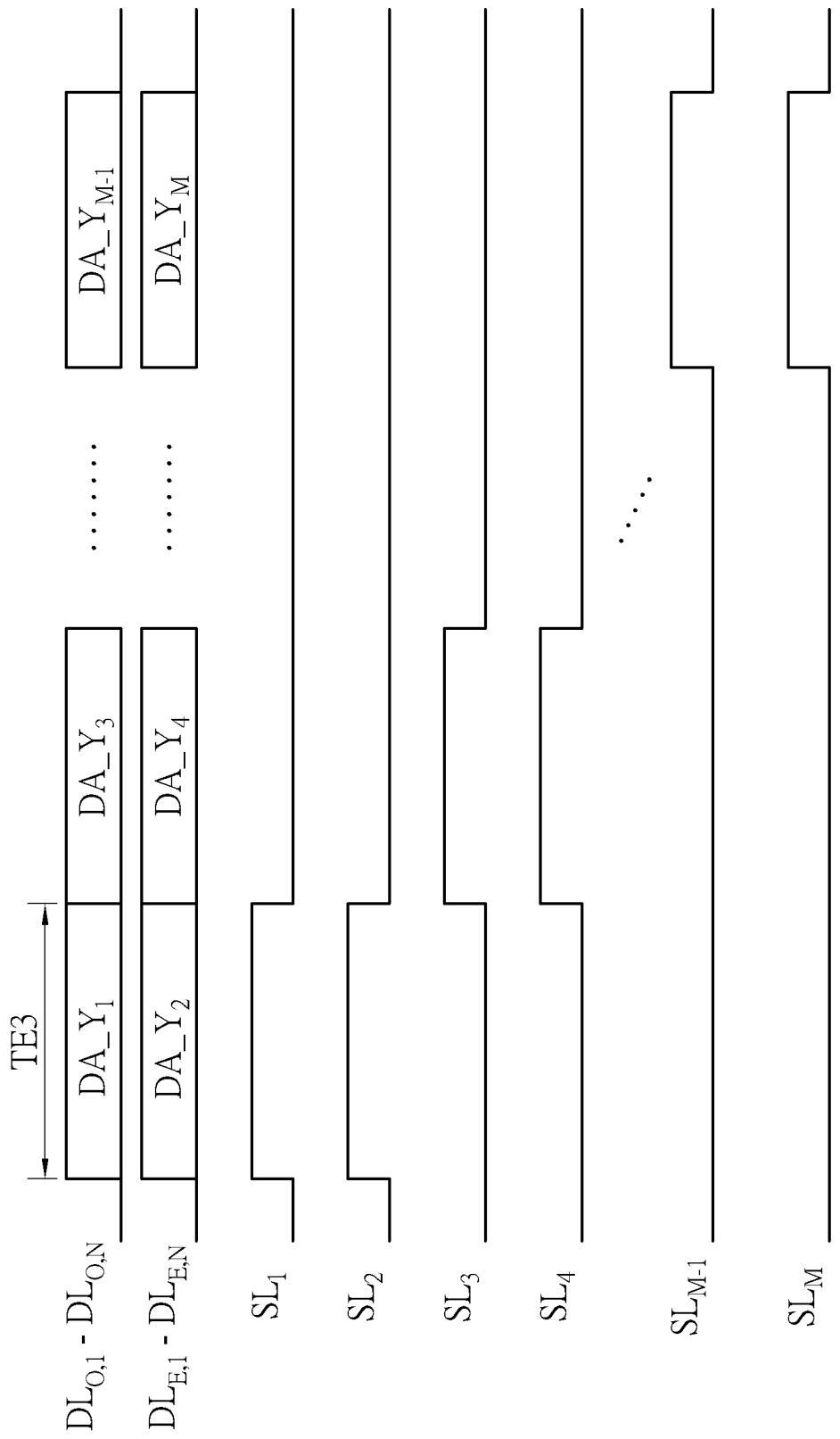
FIG. 9 is a diagram illustrating exemplary scanning timing of the groups of scan lines and the data lines shown in FIG. 7 according to an embodiment of the present invention.

Additionally, the longer the period of time during which the row of pixel units is enabled, the more sufficient response time the liquid crystal material has. Each pixel unit may have much better optical efficiency. Please refer to FIG. 9, which is a diagram illustrating exemplary scanning timing of the M groups of scan lines $SL_1$-$SL_M$ and the data lines $DL_1$-$DL_M$ shown in FIG. 7 according to an embodiment of the present invention. In this embodiment, the gate driver 722 shown in FIG. 7 enables two rows of pixel units at a time, so as to write data/reset voltages provided by the source driver 726 into two rows of pixel units. The main difference between the driving operation shown in FIG. 9 and the driving operation shown in FIG. 8 is that a period of time TE3 shown in FIG. 9 is twice the period of time TE2 shown in FIG. 6. Hence, in a case where the scan time required to drive the M groups of scan lines $SL_1$-$SL_M$ shown in FIG. 7 is equal to the scan time required to drive the M groups of scan lines $SL_1$-$SL_M$ shown in FIG. 2, the liquid crystal material may have relatively sufficient response time since a period of time during which a row of pixel units is increased, which improves optical efficiency.

In brief, the proposed driving mechanism may drive a plurality of scan lines according to a scanning sequence to thereby enable rows of pixel units alternately, wherein at least one row of pixel units is enabled one at a time.

It should be noted that although each pixel unit shown in FIG. 2/FIG. 7 is coupled to a plurality of scan lines, this is not meant to be a limitation of the present invention. In an alternative design, a transmission gate within a pixel unit shown in FIG. 2/FIG. 7 may be implemented by a P-type metal-oxide semiconductor field effect transistor (PMOSFET) or an N-type metal-oxide semiconductor field effect transistor (NMOSFET), wherein each pixel unit may be coupled to a single scan line.

Figure 10:
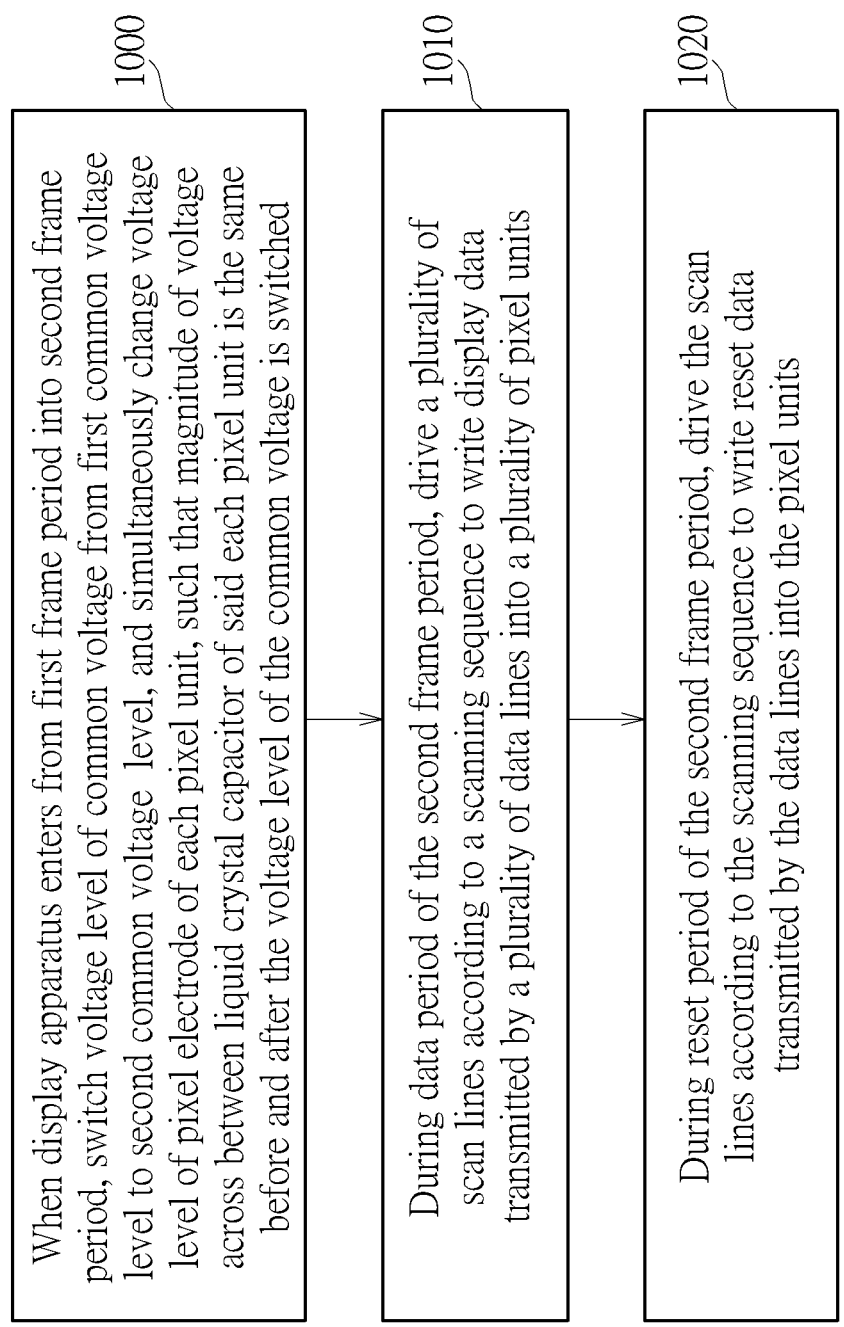
FIG. 10 is a flow chart of an exemplary driving method for a display apparatus according to an embodiment of the present invention.

FIG. 10 is a flow chart of an exemplary driving method for a display apparatus according to an embodiment of the present invention. For illustrative purposes, the driving method shown in FIG. 10 is described with reference to the display apparatus 200 shown in FIG. 2 and the operation timing shown in FIG. 3. This is not intended to limit the scope of the present invention. Additionally, provided that the result is substantially the same, steps may be executed in the exact order shown in FIG. 10. Other steps may be added. The driving method shown in FIG. 10 may be summarized below.

Step 1000: when the display apparatus 200 enters from the frame period F1 into the frame period F2, the control circuit 210 may switch the voltage level of the common voltage $V_{COM}$ from a first common voltage level (e.g. the common voltage level L1) to a second common voltage level (the common voltage level L2) different from the first common voltage level, and simultaneously the voltage level of the pixel electrode of each pixel unit may be changed, such that a magnitude of a voltage across between the liquid crystal capacitor of said each pixel unit is the same before and after the voltage level of the common voltage $V_{COM}$ is switched.

Step 1010: during the data period DP of the frame period F2, the driver circuit 220 (e.g. the gate driver 222) may drive the scan lines $SLP_1$-$SLP_M$ and $SLN_1$-$SLN_M$ according to a scanning sequence so as to write display data transmitted by the data lines $DL_1$-$DL_N$ into the pixel units $202_{1,1}$-$202_{M,N}$.

Step 1020: during the reset period RP of the frame period F2, the driver circuit 220 (e.g. the gate driver 222) may drive the scan lines $SLP_1$-$SLP_M$ and $SLN_1$-$SLN_M$ according to the scanning sequence so as to write reset data transmitted by the data lines $DL_1$-$DL_N$ into the pixel units $202_{1,1}$-$202_{M,N}$.

In some embodiments, the control circuit 210 may switch the voltage level of the common voltage $V_{COM}$ to the second common voltage level (step 1000) after each of the pixel units $202_{1,1}$-$202_{M,N}$ is reset during the frame period F1.

In some embodiments, the driver circuit 220 may drive the scan lines $SLP_1$-$SLP_M$ and $SLN_1$-$SLN_M$ concurrently to reset respective voltage levels of pixel electrodes of the pixel units $202_{1,1}$-$202_{M,N}$, thereby changing the voltage level of the pixel electrode of each pixel unit during transition between the frame periods F1 and F2 (step 1000). In some other embodiments, it is possible to direct reset the respective voltage levels of the pixel electrodes of the pixel units $202_{1,1}$-$202_{M,N}$. For example, the control circuit 210 may direct apply reset voltages on the pixel electrodes of the pixel units $202_{1,1}$-$202_{M,N}$ (step 1000).

In some embodiments where the pixel electrodes of the pixel units $202_{1,1}$-$202_{M,N}$ may have first reset voltage levels (e.g. 6V) respectively before the voltage level of the common voltage $V_{COM}$ is switched to the second common voltage level, the respective voltage levels of the pixel electrodes of the pixel units $202_{1,1}$-$202_{M,N}$ may be set to second reset voltage levels (e.g. 0V) respectively (step 1000), wherein regarding the pixel electrode of each pixel unit, the first common voltage level subtracted from the first reset voltage level of the pixel electrode (e.g. 0V-6V) is equal to the second reset voltage level of the pixel electrode subtracted from the second common voltage level (e.g. 0V-6V).

In some embodiments, in step 1000, the voltage level of the pixel electrode of each pixel unit may be changed by setting the respective voltage levels of the pixel electrodes of the pixel units $202_{1,1}$-$202_{M,N}$ to first reset voltage levels respectively (step 1010). When the reset data is written into the pixel units $202_{1,1}$-$202_{M,N}$ during the reset period RP (step 1030), the pixel electrodes of the pixel units $202_{1,1}$-$202_{M,N}$ have second reset voltage levels respectively, wherein regarding said each pixel unit, a corresponding second reset voltage level (e.g. 0V) may be equal to a corresponding first reset voltage level (e.g. 0V).

In some embodiments, it is possible to have different reset voltage levels applied to different pixel units, wherein the liquid crystal response time may be controlled accordingly. As a person skilled in the art can readily understand operation of each step shown in FIG. 10 after reading above paragraphs directed to FIGS. 1-9, further description is omitted here for brevity.

Figure 11:
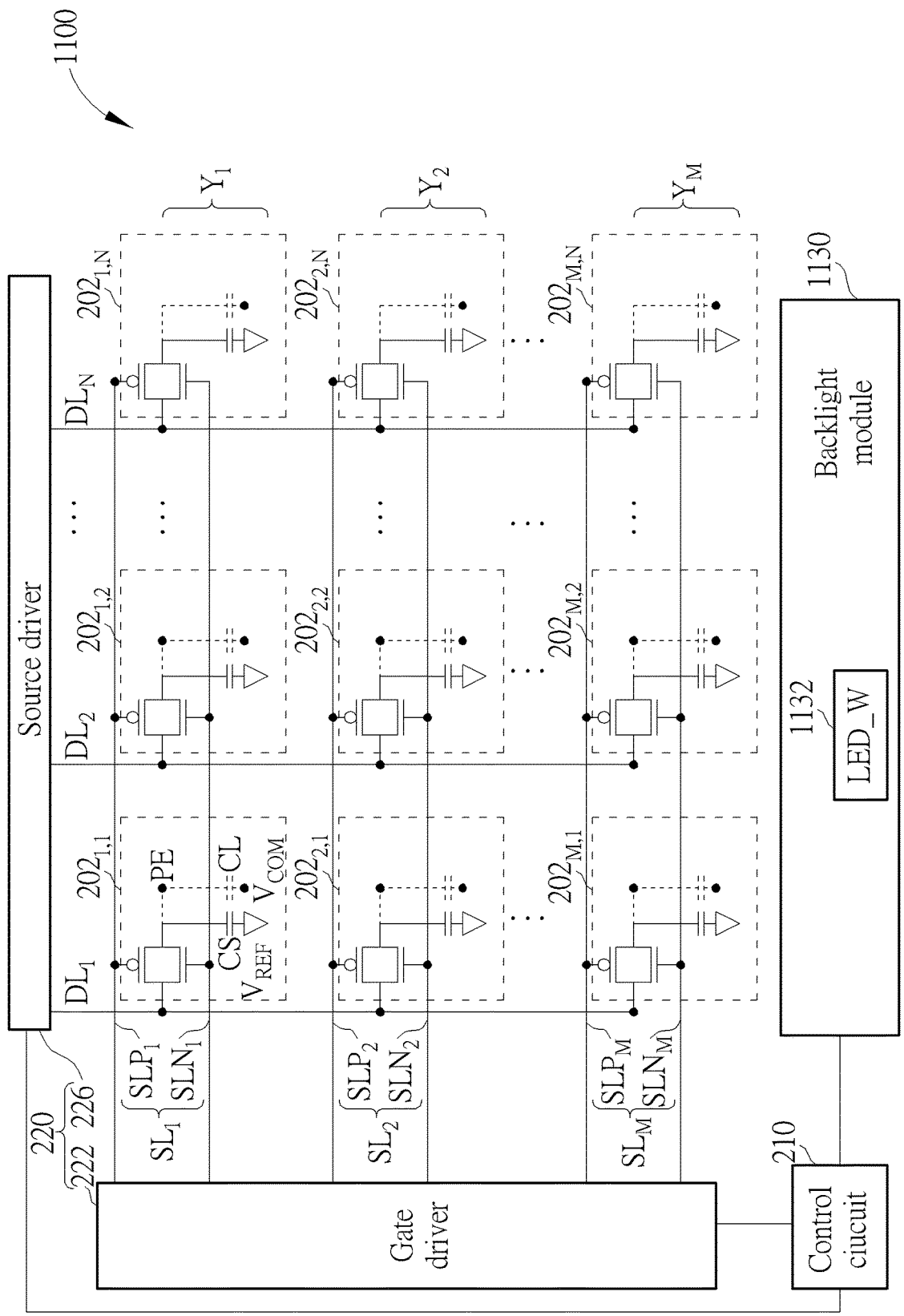
FIG. 11 is a diagram illustrating an exemplary display apparatus according to an embodiment of the present invention.
Figure 12:
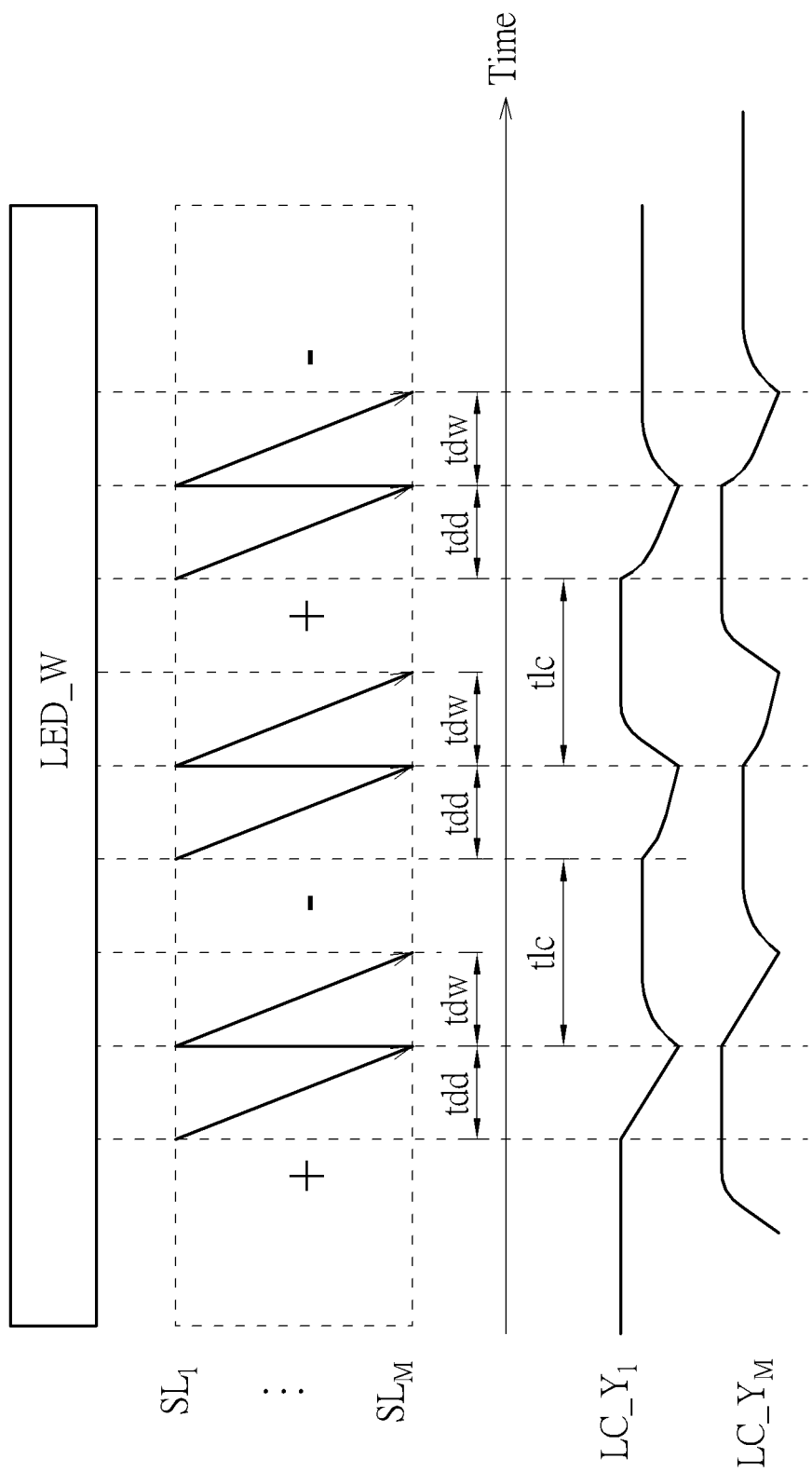
FIG. 12 is a diagram illustrating exemplary operation timing of the display apparatus shown in FIG. 11 according to an embodiment of the present invention.

The proposed driving mechanism may be employed in a color-filter display apparatus. Please refer to FIG. 11 and FIG. 12 together. FIG. 11 is a diagram illustrating an exemplary display apparatus according to an embodiment of the present invention. FIG. 12 is a diagram illustrating exemplary operation timing of the display apparatus 1100 shown in FIG. 11 according to an embodiment of the present invention. The structure of the display apparatus 1100 may be based on the structure of the display apparatus 200 shown in FIG. 2, wherein the main difference is that the display apparatus 1100 may be implemented by a color-filter display apparatus such as a color-filter LCOS display. Hence, a light emitting device included in the backlight module 1130 may be implemented by a white LED 1132 (labeled LED_W) which may keep activated.

During a time period tdw, the gate driver 222 may drive the M groups of scan lines $SL_1$-$SL_M$ according to a scanning sequence so as to write display data into the pixel units $202_{1,1}$-$202_{M,N}$. During a time period tlc, liquid crystal material of a row of pixel units responds to received data voltages (a bright portion of a liquid crystal response). During a time period tdd, the gate driver 222 may drive the M groups of scan lines $SL_1$-$SL_M$ according to the scanning sequence so as to reset the pixel units $202_{1,1}$-$202_{M,N}$ (e.g. writing reset data such as dark data, bright data or predetermined gray level data into the pixel units $202_{1,1}$-$202_{M,N}$). During transition between frame periods (switching between a positive frame and a negative frame), the display apparatus 1100 modulate/toggle the common voltage $V_{COM}$ while maintaining a DC balance on liquid crystal material. As a person skilled in the art can readily understand operation of the display apparatus 1100 shown in FIG. 11 and associated operation timing shown in FIG. 12 after reading above paragraphs directed to FIGS. 1-10, further description is omitted here for brevity.

With the aid of the proposed driving mechanism, the display apparatus may have a simple pixel design (e.g. a 2T1C pixel or a 1T1C pixel) without the need of temporarily storing display data in advance, such that the size of a pixel may be reduced accordingly (e.g. 2.5 um×2.5 um in a color-sequential driving scheme).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving method for a display apparatus, the display apparatus comprising a plurality of data lines, a plurality of scan lines, and a plurality of pixel units coupled to the data lines and the scan lines, each pixel unit comprising a pixel electrode and a common electrode, a liquid crystal capacitor being formed between the pixel electrode and the common electrode, respective common electrodes of the pixel units being coupled to a common voltage, the driving method comprising:

when the display apparatus enters from a first frame period into a second frame period, switching a voltage level of the common voltage from a first common voltage level to a second common voltage level different from the first common voltage level, wherein both the first common voltage level and the second common voltage level are greater than or equal to zero, and simultaneously changing a voltage level of the pixel electrode of said each pixel unit, such that a magnitude of a voltage across the liquid crystal capacitor of said each pixel unit is the same before and after the voltage level of the common voltage is switched;

during a data period of the second frame period, driving the scan lines according to a scanning sequence so as to write display data transmitted by the data lines into the pixel units; and during a reset period of the second frame period, driving the scan lines according to the scanning sequence so as to write reset data transmitted by the data lines into the pixel units;

wherein the second common voltage level is maintained for the entire second frame period.

2. The driving method of claim 1, wherein the step of switching the voltage level of the common voltage from the first common voltage level to the second common voltage level is executed after each of the pixel units is reset during the first frame period.

3. The driving method of claim 1, wherein the step of changing the voltage level of the pixel electrode of said each pixel unit comprises:

driving the scan lines concurrently to reset respective voltage levels of pixel electrodes of the pixel units.

4. The driving method of claim 1, wherein before the voltage level of the common voltage is switched to the second common voltage level, pixel electrodes of the pixel units have first reset voltage levels respectively; and the step of changing the voltage level of the pixel electrode of said each pixel unit comprises:

setting respective voltage levels of the pixel electrodes of the pixel units to second reset voltage levels respectively;

wherein regarding the pixel electrode of said each pixel unit, the first common voltage level subtracted from the first reset voltage level of the pixel electrode is equal to the second reset voltage level of the pixel electrode subtracted from the second common voltage level.

5. The driving method of claim 1, wherein a scan time period required for driving the scan lines to write the display data into the pixel units is equal to a scan time period required for driving the scan lines to write the reset data into the pixel units.

6. The driving method of claim 1, wherein at least one of a scan time period required for driving the scan lines to write the display data into the pixel units and a scan time period required for driving the scan lines to write the reset data into the pixel units is shorter than or equal to half the second frame period.

7. The driving method of claim 1, wherein the pixel units are arranged in a plurality of rows; when the scan lines are driven according to the scanning sequence, the rows of pixel units are enabled alternately, and at least one row of pixel units is enabled one at a time.

8. The driving method of claim 1, wherein the step of changing the voltage level of the pixel electrode of said each pixel unit comprises:

setting respective voltage levels of pixel electrodes of the pixel units to first reset voltage levels respectively;

wherein when the reset data is written into the pixel units, the pixel electrodes of the pixel units have second reset voltage levels respectively; and regarding said each pixel unit, a corresponding second reset voltage level is equal to a corresponding first reset voltage level.

9. The driving method of claim 1, wherein the reset data is dark data, bright data or predetermined gray level data.

10. The driving method of claim 1, wherein the display apparatus is a color-sequential display apparatus; and the driving method further comprises:

during the first frame period, emitting light of a first color to display an image having the first color; and during the second frame period, emitting light of a second color different from the first color to display an image having the second color.

11. A display apparatus, comprising:
a plurality of data lines;
a plurality of scan lines;
a plurality of pixel units, coupled to the data lines and the scan lines, wherein each pixel unit comprises a pixel electrode and a common electrode, a liquid crystal capacitor is formed between the pixel electrode and the common electrode, and respective common electrodes of the pixel units are coupled to a common voltage;
a control circuit, for providing the common voltage, wherein when the display apparatus enters from a first frame period into a second frame period, the control circuit switches a voltage level of the common voltage from a first common voltage level to a second common voltage level different from the first common voltage level, wherein both the first common voltage level and the second common voltage level are greater than or equal to zero; and
a driver circuit, coupled to the data lines and the scan lines, wherein when the control circuit switches the voltage level of the common voltage from the first common voltage level to the second common voltage level, the driver circuit drives the scan lines concurrently to reset respective voltage levels of pixel electrodes of the pixel units, such that a magnitude of a voltage across the liquid crystal capacitor of said each pixel unit is the same before and after the voltage level of the common voltage is switched; during a data period of the second frame period, the driver circuit drives the scan lines according to a scanning sequence so as to write display data transmitted by the data lines into the pixel units; and during a reset period of the second frame period, the driver circuit drives the scan lines according to the scanning sequence so as to write reset data transmitted by the data lines into the pixel units, wherein the second common voltage level is maintained for the entire second frame period.

12. The display apparatus of claim 11, wherein the control circuit switches the voltage level of the common voltage from the first common voltage level to the second common voltage level after each of the pixel units is reset during the first frame period.

13. The display apparatus of claim 11, before the voltage level of the common voltage is switched to the second common voltage level, pixel electrodes of the pixel units have first reset voltage levels respectively; when the control circuit switches the voltage level of the common voltage from the first common voltage level to the second common voltage level, the driver circuit sets respective voltage levels of the pixel electrodes of the pixel units to second reset voltage levels respectively; and regarding the pixel electrode of said each pixel unit, the first common voltage level subtracted from the first reset voltage level of the pixel electrode is equal to the second reset voltage level of the pixel electrode subtracted from the second common voltage level.

14. The display apparatus of claim 11, wherein a scan time period required for the driver circuit to drive the scan lines to write the display data into the pixel units is equal to a scan time period required for the driver circuit to drive the scan lines to write the reset data into the pixel units.

15. The display apparatus of claim 11, wherein at least one of a scan time period required for the driver circuit to drive the scan lines to write the display data into the pixel units and a scan time period required for the driver circuit to drive the scan lines to write the reset data into the pixel units is shorter than or equal to half the second frame period.

16. The display apparatus of claim 11, wherein the pixel units are arranged in a plurality of rows; the driver circuit drives the scan lines according to the scanning sequence to enable the rows of pixel units alternately, and at least one row of pixel units is enabled one at a time.

17. The display apparatus of claim 11, wherein when the control circuit switches the voltage level of the common voltage from the first common voltage level to the second common voltage level, the driver circuit sets respective voltage levels of pixel electrodes of the pixel units to first reset voltage levels respectively; when the driver circuit write the reset data is into the pixel units, the pixel electrodes of the pixel units have second reset voltage levels respectively; and regarding said each pixel unit, a corresponding second reset voltage level is equal to a corresponding first reset voltage level.

18. The display apparatus of claim 11, wherein the reset data is dark data, bright data or predetermined gray level data.

19. The display apparatus of claim 11, wherein the display apparatus is a color-sequential display apparatus; and the display apparatus further comprises:
- a first light emitting device, coupled to the control circuit, wherein during the first frame period, the control circuit enables the first light emitting device to emit light of a first color; and
- a second light emitting device, coupled to the control circuit, wherein during the second frame period, the control circuit enables the second light emitting device to emit light of a second color different from the first color;
- wherein the display apparatus displays an image having the first color during the first frame period, and displays an image having the second color during the second frame period.

20. The display apparatus of claim 11, wherein the display apparatus is a color-filter display apparatus.

* * * * *